(12) United States Patent
Vilgiate et al.

(10) Patent No.: US 6,302,595 B1
(45) Date of Patent: Oct. 16, 2001

(54) OPTICAL TRANSMISSION SYSTEM

(75) Inventors: Anthony W. Vilgiate, Lake Forest; Richard L. Dienst, Mission Vlejo, both of CA (US)

(73) Assignee: Bivar, Inc., Irvine, CA (US)

( * ) Notice: Subject to any disclaimer, the term of this patent is extended or adjusted under 35 U.S.C. 154(b) by 0 days.

(21) Appl. No.: 09/525,304

(22) Filed: Mar. 14, 2000

(51) Int. Cl.$^7$ .................................................. G02B 6/36
(52) U.S. Cl. .............................................. 385/88; 385/93
(58) Field of Search .......................... 385/88–94, 33, 385/147; 362/555, 559, 581

(56) References Cited

U.S. PATENT DOCUMENTS

| | | |
|---|---|---|
| 2,035,998 | 3/1936 | Thompson . |
| 2,367,858 | 1/1945 | Flynn . |
| 3,532,873 | 10/1970 | Batson et al. . |
| 3,805,048 | 4/1974 | Brennesholtz . |
| 4,461,537 | 7/1984 | Baumer, II et al. .................. 385/92 |
| 4,718,744 | 1/1988 | Manning ................................ 385/92 |
| 4,826,273 | 5/1989 | Tinder et al. ......................... 385/78 |
| 4,986,625 | 1/1991 | Yamada et al. ....................... 385/79 |
| 5,086,378 | 2/1992 | Prince .................................. 362/103 |
| 5,440,658 | 8/1995 | Savage, Jr. ........................... 385/79 |
| 5,548,676 | 8/1996 | Savage, Jr. ........................... 385/92 |
| 5,732,176 | 3/1998 | Savage, Jr. ........................... 385/92 |
| 5,818,995 | * 10/1998 | Savage, Jr. ........................... 385/92 |
| 5,938,324 | 8/1999 | Salmon et al. ....................... 362/55 |

* cited by examiner

Primary Examiner—Phan T. H. Palmer
(74) Attorney, Agent, or Firm—Harold L. Jackson (57) ABSTRACT

An optical transmission system for coupling light from LED mounted on circuit boards includes a flexible light pipe that is bonded to a lens unit at one end and receives a fitting base at the other end. The lens unit is made to be pressed into and held in a hole in a panel and receive the light pipe through its rear structure. The fitting base may be shaped to be plugged into a circuit board over a board mounted LED or have the LED contained therein with leads to be soldered into a circuit board metal traces. The lens unit and fitting can be standardized and inventoried in large quantities to be assembled to meet a variety of instrumentation requirements in display panel.

27 Claims, 4 Drawing Sheets

OPTICAL TRANSMISSION SYSTEM

FIELD OF THE INVENTION

This invention relates generally to optical coupling of remotely located light sources to a display site, and more particularly, it is directed to optical coupling of light-emitting diodes through a light pipe to light diffusing lenses located at the display site.

BACKGROUND OF THE INVENTION

Light emitting diodes (LEDs) or other such light sources provide visual information for many applications. Typically LEDS are mounted on printed circuit boards along with other electronic components such as resistors, capacitors, transistors, inductors, semiconductor chips, which at least in part function to turn on and off the LEDs at the appropriate times. In order to view the output of the LED, its light providing information may be transferred along a light pipe and displayed at a display site location such as on a panel. Many prior art arrangements have evolved over the years in an attempt to provide light source monitoring. For example, in U.S. Pat. No. 3,532,873 entitled Apparatus for Monitoring Light Source Operation, a light pipe arrangement is disclosed in which multiple light sources are combined into a single display point. The mounting sleeve member for the end of the single light pipe is inserted through and abuts the rear side of a panel providing viewing of the end of the light pipe at the front of the panel.

In U.S. Pat. No. 4,826,273, entitled Remote, Automotive Light Diverting System, a light pipe captures light from an LED or other light emitting source and conducts that light to a light diverting section which changes the light from a columnar to a radial format to enable the light to be seen from multiple locations.

As another example, U.S. Pat. No. 5,938,324 entitled Light Pipe discloses a light pipe for transmitting LED emitted light from a printed circuit board through an opening in a display panel. The light pipe has a light-transmitting member having a first end for emitting the transmitted light through one of the openings, a second end which forms a connecting portion for attaching the light pipe to the printed circuit board, and a fastener for removably fastening the light pipe to the display panel. A groove on the outer surface of the light-transmitting member in combination with a pair of clips form an exemplary fastener.

Further, in U.S. Pat. No. 5,818,995, entitled Lens Unit and Light Pipe Assembly, a light transmission device is disclosed, which includes a short light pipe segment disposed within a lens unit. The lens unit is mounted in a panel and receives light from an LED mounted in another panel directly behind but spaced from the light pipe.

Yet, as another example, U.S. Pat. No. 5,548,676, entitled Light Pipe Optical Coupling Between LED and Fiber Optic Cable discloses a mounting structure for containing an LED with a light-passing lens, an optical cable facing the LED lens and a light reflecting light pipe for focusing the LED light into the optical cable entrance.

Equipment display panels may use such light transmitting schemes to display status information or other data or desired information to a user. A number of display lights can be mounted on a panel, such as in row and/or column format. Accordingly, many light pipe assemblies may be necessary for a given design requirement. Conventional assemblies of light pipe assemblies in conjunction with circuit boards and display panels can be time consuming to assemble and difficult to disassemble for repair or other servicing. As such, while conventional light pipe transmitting schemes have been used in industry for many years, it would be advantageous to provide a simpler arrangement to couple light from a remotely located circuit board to a display location. Such a light transmitting arrangement that is also simple to manufacture in large quantities, simple to assemble and disassemble and which provides a reliable light indicating output would result in an important advancement in the art. Thus there is a need for an improved arrangement and method to overcome difficulties in optical coupling as between light sources, light pipes and lenses.

SUMMARY OF THE INVENTION

The present invention provides an optical transmission system that includes a flexible light pipe with a lens/display panel mounting unit ("lens unit") at one end and a fitting base attached at the other end of the light pipe. The lens unit has a light transmitting/diffusing end wall and a generally cylindrically shaped structure extending rearwardly from said end wall defining a bore to receive a light pipe therein in a secure manner, for example, by a bonded interface. The rearwardly extending cylindrically shaped structure of the lens unit is designed to be secured in a complementary hole in a display panel by an interference fit, for example. The other end of the light pipe is adapted to be positioned over a light-emitting element such as an LED, by means of the fitting base. The fitting base defines a hole for receiving the light pipe therein in a secure manner such as, for example, in an interference fit manner. The fitting base can be of a type that can be "plugged" into a circuit card over an LED that has been electrically mounted to the circuit card. Alternatively, the fitting base may house the LED, with the LED wire leads attached as by soldering to metal conductive traces on the circuit card.

Surprisingly, this simple optical transmitting arrangement comprising the lens unit, flexible light pipe and fitting base quickly and securely attach together to enable light generated by an LED located on a remote circuit board to be viewed at a nearby display panel. Furthermore, the relative simplicity of this arrangement allows the lens unit, flexible light pipe and board mounting fitting to be economically manufactured and made in large quantities. The light pipe may conveniently be cut to the desired lengths at the assembly site and the entire system may be easily assembled and disassembled between a display panel and circuit card without any special tools or fixtures.

The construction and operation of a preferred embodiment of the optical transmission arrangement of the present invention may best be understood by reference to the following description taken in conjunction with the accompanying drawings.

DESCRIPTION OF THE PREFERRED EMBODIMENT

Figure 1:
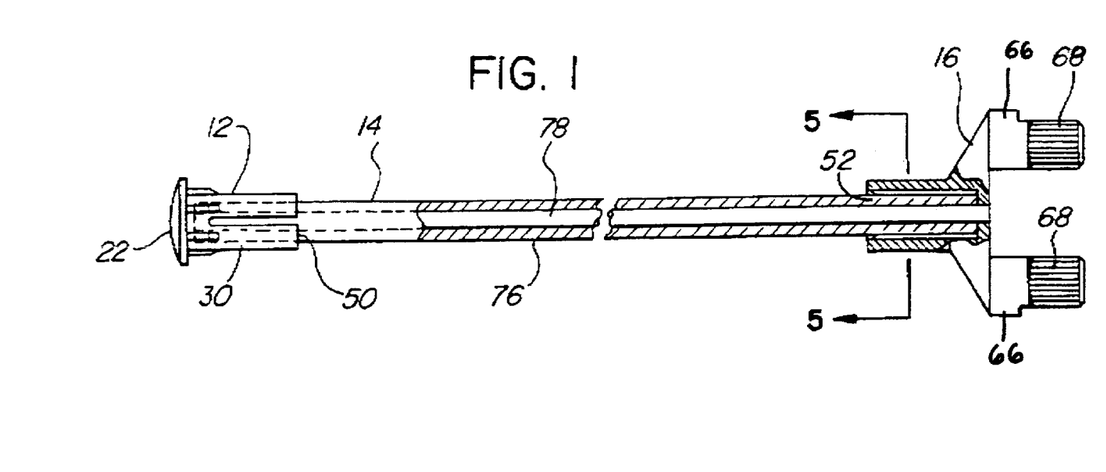
FIG. 1 is a side view partially broken away of the optical transmission system of the present invention, illustrating its principal parts, namely the lens unit, light pipe and fitting base.

Referring now to the drawings and more particularity to FIG. 1, there is shown an optical transmission system for providing optical coupling of light from a remote light source such as an LED, located on a printed circuit board or the like, to a nearby display location. The optical transmission system in its basic form includes a lens unit 12, a flexible light pipe 14 and a fitting base 16. The light pipe 14 may be of any conventional light transmitting cable having a light entrance end for receiving light from a light source and a light exit end. Preferably the light pipe is made of a flexible extruded plastic mono-fiber such as polymethyl methacrylate ("PMMA").

Figure 2:
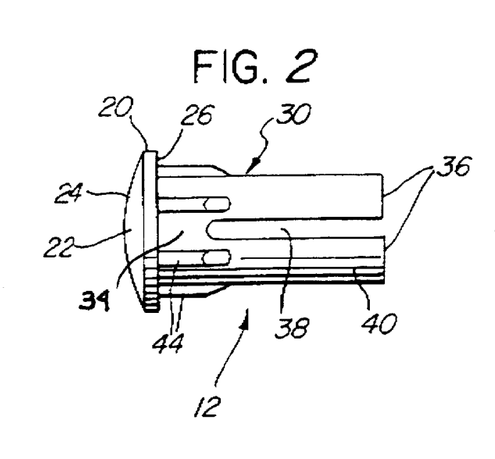
FIG. 2 is a side view of the lens unit of the optical transmission system.
Figure 3:
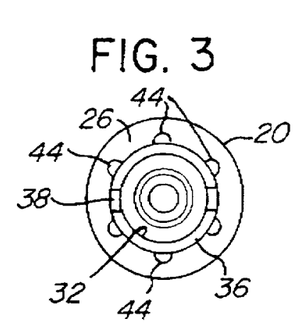
FIG. 3 is a rear view of the lens unit shown in FIG. 2.
Figure 4:
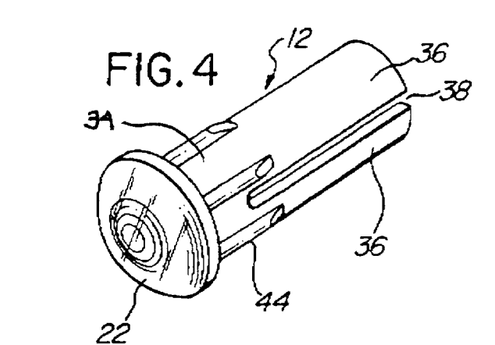
FIG. 4 is a frontal perspective view of the lens unit shown in FIG. 2.
Figure 14:
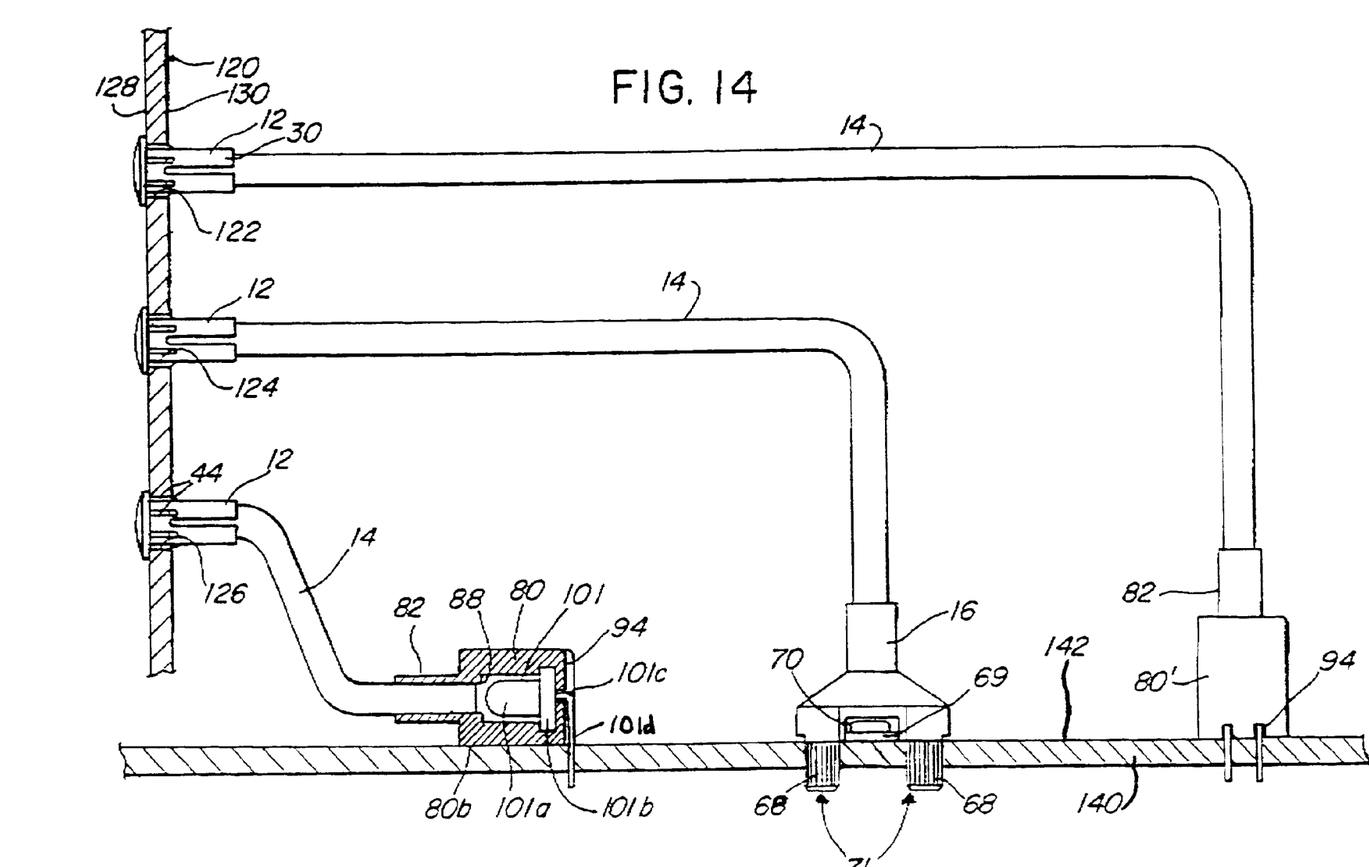
FIG. 14 is a side elevational view of a plurality of optical transmission systems assembled with a display panel and circuit card.

A preferred lens unit 12, made for example of polycarbonate, is illustrated in FIGS. 2–4. The lens unit is in the form of a headed pin with a light transmitting end wall 20 forming the head. The end wall includes a diffusing lens 22 and a rearwardly facing annular shoulder 26. The forward surface 24 of the lens 22 preferably has a spherical contour for spreading light coming therethrough. The lens unit preferably has a tubular structure 30, as shown, extending generally axially and rearwardly from the end wall 20. The rearwardly facing shoulder 26 functions as a stop to limit the movement of the lens unit within an opening in a display panel, as is illustrated in FIG. 14 and as will be more fully explained. This rearward structure can be of any desired shape such as a square or rectangle, etc., but preferably has a generally cylindrically shaped exterior surface to be received within a circular opening in a display panel, as is illustrated in FIG. 14.

The interior of the structure 30, forming a receptacle or blind bore 32 for receiving the light exit end of the light pipe, is also cylindrical and sized and shaped to receive a light pipe 14 inserted therein. The light exit end of the light pipe after insertion into the receptacle or bore 32 is bonded thereto, e.g., by a suitable adhesive or heat. This not only ensures that the light exit end of the light pipe is permanently secured to the lens unit to eliminate detachment during assembly of the system by the user or installer, but advantageously reduces the number of parts to be shipped and inventoried. One standard or several standard lengths of light pipe, e.g. 2', 3', 4', etc., may be bonded to the receptacles 32 in the lens units at the factory.

The wall 34 of the tubular structure 30 preferably has a pair of integral tongues 36 separated by gaps 38 to facilitate the assembly of the light exit end of the light pipe into the lens unit prior to the bonding step.

The exterior surface 40 of rearward structure 30 preferably has a plurality of outwardly protruding ridges 44 that extend rearwardly from the shoulder 26. These ridges 44 aid in holding the lens unit 12 in a complementary hole in a panel member, as will be described in more detail below. The end of the ridges, is remote from the shoulder 26, may be provided with barbs, if desired, to lock the lens unit in place within the panel opening. Alternatively, the exterior surface 40 may simply be sized and shaped such that it establishes a snug fit, such as interference fit, when inserted into such a panel hole.

The lens unit 12 serves a double purpose of anchoring the light exit end of the light pipe to a display panel and of diffusing the light for ease of viewing by an observer.

Figure 5:
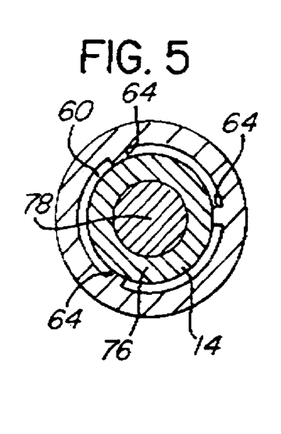
FIG. 5 is an enlarged cross-section view of the fitting base and the light pipe, taken on line 5—5 of FIG. 1.

FIG. 1 shows the light pipe 14 with its light exit end 50 inserted into the bore 32 of the rearwardly extending structure 30 of the lens unit 12. A bonded interface is established between the light pipe and the interior surface of the bore 32 of the structure 30 as pointed out above. A circuit board fitting base or mounting structure 16 is mounted at the light entrance end 52 of the light pipe 14, during assembly of the system, by the user or system installer. This fitting base 16 has a hole 60 that extends through the body 62 of the fitting base, which is illustrated with more particularity in FIGS. 5 and 6. The hole 60 may be sized and shaped to receive the light entrance end of a conventional light pipe, such as light pipe 14, in a snug fit, such as preferably in an interference manner. Alternatively, the hole 60 may have a plurality of longitudinal ridges 64 that aid in retaining a light pipe inserted into the hole 60. It should be noted that the light entrance end of the light pipe may also be bonded to the inner surface 60 of the fitting base during the assembly process.

Figure 6:
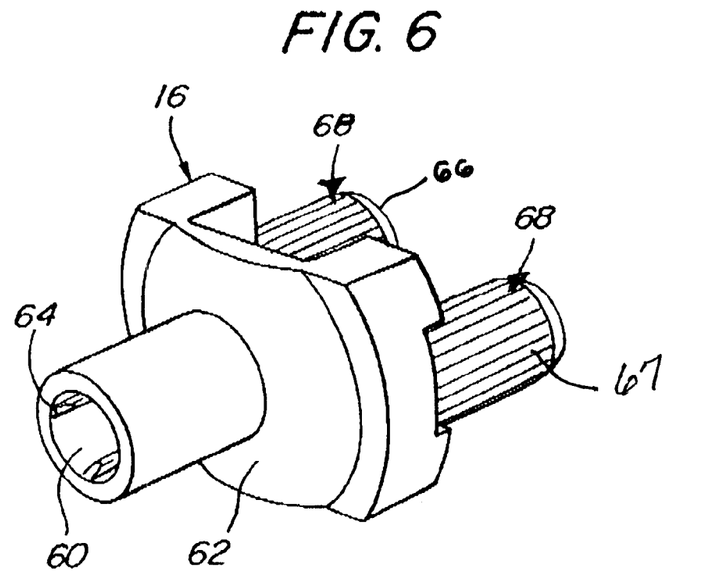
FIG. 6 is a frontal perspective view of the fitting base embodiment illustrated in FIG. 1.
Figure 7:
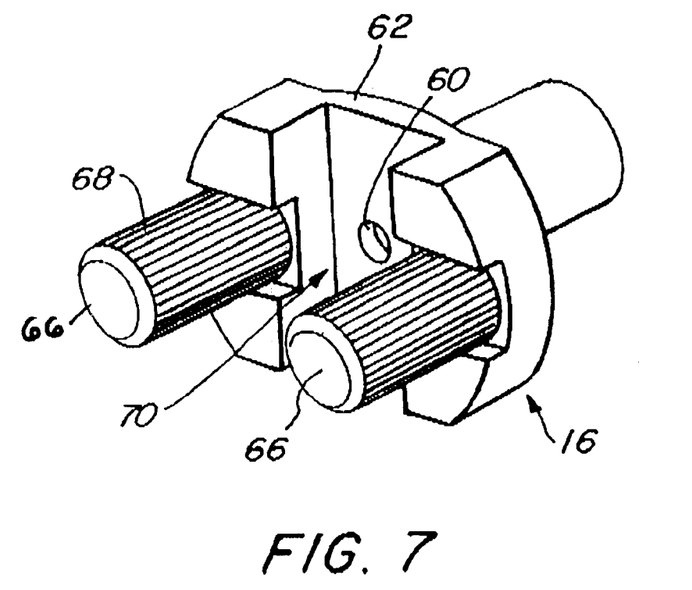
FIG. 7 is a rear perspective view of the fitting base illustrated in FIG. 6

The fitting base body 62 has a pair of downwardly disposed legs 66 with pegs 68 at each end. A cavity area 70 is formed between the legs 66 and below the body 62 with one end of the hole 60 opening into this cavity area. The mounting pegs 68 have longitudinally extending ridges 67 for bearing against the wall of openings 71 in a circuit board to secure the fitting base 16 to the board. See FIG. 14.

The light pipe may have an outer layer 76 or jacket made of opaque flexible plastic material, such as PVC, and an inner core 78 made of light transmitting plastic material, such as PMMA. Hole 60 aligns the light transmissive inner core 78 over the central area of the fitting base cavity area 70. Accordingly, when the fitting base is assembled to a circuit board by a user or system installer, hole 60 will be axially aligned with an LED 69 previously mounted on the circuit board. The LED will extend into the cavity area 70, as illustrated with more particularly in FIG. 14.

Figure 8:
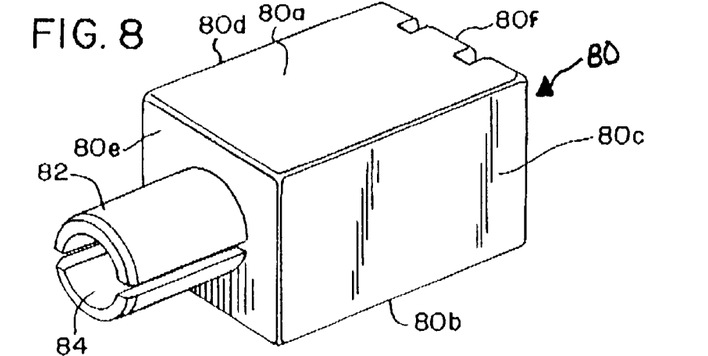
FIG. 8 is a perspective view of an alternative fitting base.
Figure 9:
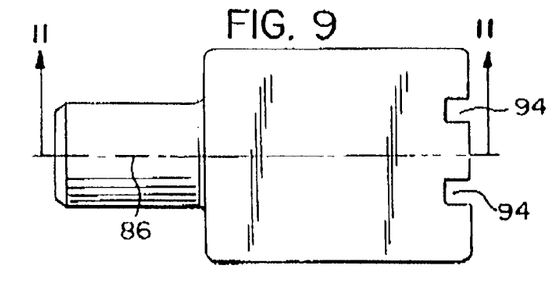
FIG. 9 is a top view of the fitting base illustrated in FIG. 8.
Figure 10:
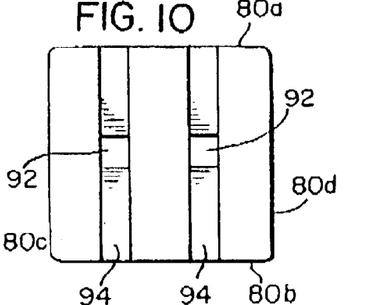
FIG. 10 is a rear view of the fitting base illustrated in FIG. 8.

Alternatively, the fitting base 16' may be in the form of a block base 80 as illustrated in FIGS. 8–10. The block base 80 may have upper and lower side walls 80a and 80b, lateral side walls 80c and 80d, an open end 80e and end wall 80f. Open end 80e has an elongated tubular portion 82 having a hole 84 therethrough with a longitudinal central axis 86. The hole 84 couples axially with cylindrical inner chamber 88, which chamber has an annular recess 90. Holes 92 through the end wall 80f terminate into grooves 94.

Figure 11:
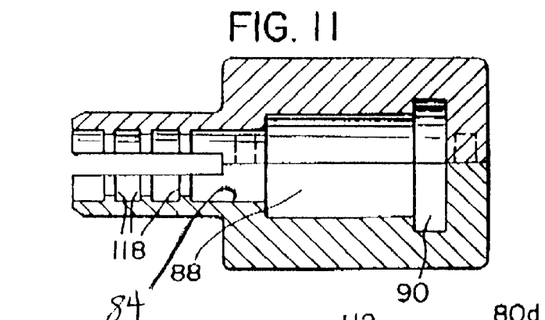
FIG. 11 is a cross-sectional view of the fitting base taken on line 11—11 of FIG. 9.
Figure 12:
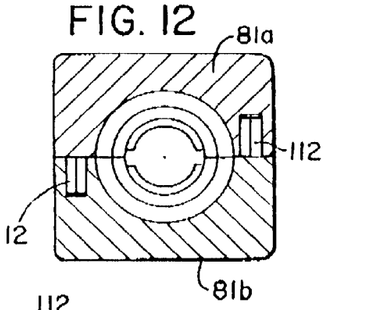
FIG. 12 is a cross-section view of the fitting base illustrating the pin and hole mating combination.
Figure 13:
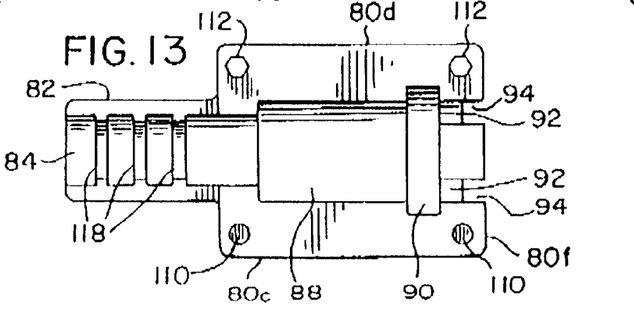
FIG. 13 is a bottom view of one of the half-sections of the fitting base illustrated in FIG. 8.

This block base 80 is preferably made of two halves 81a and 81b that are identical in structure and mated together by means of cooperative holes 110 and pegs 112, as more particularly illustrated in FIGS. 11–13. The block base elongated tubular portion 82 has a hole 84 that may be sized and shaped for receiving a light pipe 14 in a snug manner such as by an interference fit (or the light pipe may be bonded to the block base). Alternatively, the inner hole 84 may have a plurality of elongated (or radial) inwardly protruding ridges 118 that grasp the outer layer 76 of the light pipe. Three elongated ridges are shown in this example in FIGS. 11 and 13. In these structures an LED is mounted within one of the block halves 81b and the other block half 81b is placed thereon with the pegs 112 snapped into their respective holes 110. Advantageously, the hole 84 of the block base is axially aligned with the LED providing good light coupling therebetween.

In assembly, the lens unit 12, with a section of light pipe 14, is inserted through an opening in a display panel and the light entrance end is then inserted into the light pipe receiving opening in an associated fitting base. As is shown in the lowermost illustration of FIG. 14 the light entrance end of the flexible light pipe 14 extends into the hole 84 of the base fitting 80 adjacent to the leftwardmost surface extent of the LED lens 101a. The LED has a base flange 10b that seats in annular recess 90 of the block base. Terminals 101c extend back through holes 92 in the end wall 80f of the block (mounting) base and then downwardly at 101d along grooves 94. LED terminals 101c are inserted through openings in a circuit board for connection to the board circuitry such as by soldering, for example.

FIG. 14 shows a number of optical transmission assemblies, illustrating the simplicity of the system. A display panel 120 has a plurality of holes, e.g., three holes 122, 124, 126, shown in this example. The display panel may be made of sheet metal or aluminum or plastic, having a front wall 128 and rear wall 130. Lens units 12 with light pipes secured thereto are inserted into one of each of the holes with the rearwardly extending structures 30 and pre-assembled light pipes being pushed through the holes until the rearwardly facing surface 26 of walls 20 abut the front wall 128 of the panel 120. The ridges 44 engage the inner surface of the panel hole to hold the lens units securely in the panel. The flexible light pipes 14 may then be cut to the desired lengths. A circuit board 140 supports circuitry for operating three LEDs. A circuit board fitting base 16 is affixed to the circuit board by insertion of its two legs 66 through cooperative holes in the circuit board. The fitting base is mounted over a board mounted LED 69 with the hole 60 of the fitting base axially aligned with the LED. One of the light pipes 14 has its light entrance end inserted into the fitting base hole, with the light receiving end sitting adjacent to the LED lens providing good light coupling therebetween.

Another mounting base, described hereinabove as block base 80, has an LED 101 mounted therein with wire leads 101c soldered to metal traces of the circuit board 140. Another one of the light pipes 14 is inserted into the hole 84. This block base 80 may be mounted with its lower side 80b adjacent to the circuit card upper surface 142.

A third mounting base 80', also of the type described above as block base 80 is mounted to the circuit board by soldering the leads of its internally housed LED to the circuit board. This block base 80' is mounted with its end wall 80f sitting on the circuit card upper surface. The elongated tubular portion 82 extends upwardly to receive light pipe 14.

The sizing of the outer circumference of the rearward end of the lens unit and the sizing of the holes in the display panel and the sizing of the light pipe receiving openings in the fitting bases provide a press fit ready assembly of the system. Once the lens unit is snapped into the associated hole in the display panel and the fitting base is snapped or plugged into the circuit board the light pipe may be readily plugged into the fitting base to complete the assembly. Accordingly, assembly of the optical transmission system in conjunction with panel members and printed circuit cards is easy and inexpensive. By the same token the system can be quickly and readily disassembled.

There has thus been described an improved optical transmission system. Any number and combination of above described optical assemblies can be employed Large quantities of lens units and mounting bases can be readily manufactured at relatively low costs. Thus, large customer demands for product can be met quickly and reliably. Advantageously, one lens unit can be used with a variety of mounting bases. Accordingly, various modifications of the optical transmission system will occur to persons skilled in the art without involving any departure from the spirit and scope of the invention as set forth in the appended claims.

What is claimed is:

1. An optical transmission system for coupling light from a printed circuit board to a remote panel having an opening through which the light is to be transmitted, comprising:

an elongated flexible light pipe having a light entrance and a light exit end;

a lens unit having a light transmitting end wall defining a lens, a rearwardly facing shoulder for abutting a surface surrounding the display panel opening and a rearward structure extending away from said end wall and generally axially with the end wall lens, the rearward structure being arranged to extend through the display panel opening and defining a light pipe receptacle, the light exit end of the light pipe being bonded to the receptacle; and a circuit board fitting base adapted to be secured to the circuit board and having a receptacle for receiving the light entrance end of the light pipe.

2. The optical transmission system defined in claim 1 wherein the fitting base has an internal cavity for housing an LED and the receptacle having a hole opening into the cavity for receiving the light entrance end of the light pipe and communicating light from the LED into the light pipe.

3. The optical transmission system defined in claim 2 wherein the fitting base has a rear end wall having two or more holes for insertion of two or more leads from an LED.

4. The optical transmission system defined in claim 3 wherein rear wall of the fitting base further has two or more grooves extending over each one of the holes.

5. The optical transmission system defined in claim 2 wherein the fitting base has an elongated tubular portion with a hole extending into the internal cavity, the hole thereof sized and shaped to receive the light entrance end of the light pipe in an interference manner.

6. The optical transmission system defined in claim 5 wherein the fitting base is made of two identical halves, each half having a cylindrically recessed portion with an annular ring shaped recess for cooperatively receiving an LED with a mounting flange.

7. The optical transmission system of claim 1 wherein the display panel opening is circular and the lens unit is the form of a cylindrical headed pin with the end wall lens comprising the head and the rearward structure comprising the pin, the pin having a generally cylindrical inner opening forming the light pipe receptacle for receiving the light exit end of the light pipe.

8. The optical transmission system of claim 7 wherein the pin includes a plurality of ribs extending radially outwardly from the exterior surface, the ribs being sized to form a press fit with an interior surface of the display panel opening.

9. The optical transmission system defined in claim 1 wherein the fitting base has a body with an axial hole and two circuit board mounting pegs, the axial hole sized and shaped to receive the light entrance end of the light pipe in an interference manner.

10. The optical transmission system defined in claim 9 wherein the circuit board includes a pair of holes straddling a light source and wherein mounting pegs have longitudinally extending ridges for engaging the holes in the circuit board.

11. An optical transmission system for mounting in a hole on a display panel to couple light from a remote source to the panel, comprising:
  a lens unit having a light transmitting end wall with a generally spherically contoured forwardly facing surface for spreading light coming therethrough and having a generally cylindrically shaped structure extending rearwardly from said end wall, the rearwardly extending structure having a cylindrically shaped inner wall forming a light pipe receptacle and an outer wall sized to seat snuggly in the hole in the display panel; and
  a light pipe having a light exit end bonded to the inner wall of the light pipe receptacle and a light entrance end adapted to receive light from the remote light source.

12. The optical transmission arrangement defined in claim 11 wherein the cylindrically shaped structure has a plurality of circumferentially arranged axially extending relief gaps forming resilient tongues therebetween for accommodating the insertion of the exit end of the light pipe prior to bonding.

13. The optical transmission arrangement defined in claim 11 wherein the cylindrically shaped structure outer wall has a plurality of outwardly extending protruding ridges for engaging the hole of the display panel.

14. The optical transmission arrangement defined in claim 11 wherein the cylindrically shaped structure outer wall is sized to seat in the display hole panel in an interference fit manner.

15. The optical transmission arrangement defined in claim 11 wherein the light transmitting end wall has a rearwardly facing shoulder.

16. The optical transmission arrangement defined in claim 15 further comprising a light pipe and mounting panel having a hole therein, the cylindrically shaped structure inserted into the hole with the rearwardly facing shoulder abutting the mounting panel.

17. The optical transmission arrangement defined in claim 16 further comprising a light emitting diode and a fitting base, the light pipe being coupled to the fitting base which is mounted over the light emitting diode.

18. The optical transmission arrangement defined in claim 17 further comprising a printed circuit board, the light emitting diode being electrically attached to the printed circuit board.

19. An optical transmission system for coupling light from an LED electrically connected to a remotely located printed circuit board to a display panel, comprising:
  an elongated flexible light pipe having two ends;
  a lens unit having a light transmitting end wall defining a diffusing lens and structure extending away from said end wall generally axially and rearwardly with respect to the end wall lens, the structure defining a receptacle for receiving one end of the light pipe and further defining an exterior for seating in a complementary hole in the panel; one end of the light pipe being bonded to the lens unit receptacle; and
  a fitting base mounted on the printed circuit board having an axial bore through which light from the LED passes and a receptacle aligned with the bore for receiving the other end of the light pipe.

20. The optical transmission system defined in claim 19 wherein the LED is mounted on the circuit board, the board having a plurality of mounting holes straddling the LED and wherein the fitting base has a plurality of downwardly extending circuit board mounting pegs which straddle the axial hole and extend through mounting holes in the circuit board, the axial hole being sized and shaped to receive the other end of the light pipe in an interference manner.

21. The optical transmission system as defined in claim 20 wherein the mounting pegs include longitudinally extending ridges.

22. The optical transmission system as defined in claim 19 wherein the fitting base has an internal cavity which houses the LED and a plurality of leads connecting the LED to conducting traces on the circuit board.

23. The optical transmission system defined in claim 22 wherein the fitting is made of two identical halves, each half having a cylindrically recessed portion with an annular ring shaped recess for cooperatively receiving an LED with a mounting flange.

24. In an optical transmission system for coupling light from an LED mounted on a remotely located printed circuit board to a display panel, the circuit board having a plurality of holes straddling the LED, the combination comprising:
  an elongated flexible light pipe having a light entrance and light exit end;
  a lens unit having a light diffusing end wall and a cylindrical structure extend rearwardly and axially from the end wall defining a light pipe receptacle for receiving the exit end of the light pipe and an exterior for seating in a complementary hole in the panel; and
  a fitting base having a plurality of circuit board mounting pegs inserted into the holes in the circuit board, and a bore through the fitting base aligned with the LED, the bore defining a receptacle for receiving the entrance end of the light pipe.

25. The optical transmission system of claim 24 wherein the fitting base pegs have protruding ridges thereon.

26. A method of coupling light from an LED mounted on a remotely located circuit board to a display panel, the circuit board having a plurality of apertures therein straddling the LED, comprising:
  providing a display panel with an opening therein;
  providing an integrally assembled lens unit and a light pipe, the light pipe having a light entrance and exit end, the lens unit having a light transmitting end wall defining a lens, a rearwardly facing shoulder for abutting a surface surrounding the opening in the display panel and a rearward structure extending away from the end wall, the rearward structure being arranged to extend through the display panel opening and defining a light pipe receptacle, the light exit end of the light pipe being bonded to the receptacle;
  providing a fitting base having an axial bore therethrough which passes light from the LED and a receptacle for receiving the light entrance end of the light pipe in a press fit relationship and a plurality of downwardly extending mounting pegs which straddle the axial bore;
  threading the light pipe and the rearward structure of the lens unit through the display panel opening until the shoulder of the light pipe abuts the surface surrounding the display panel opening;
  inserting the mounting pegs of the fitting base in the apertures in the circuit board; and inserting the light entrance end of the light pipe into the receptacle in the fitting base.

27. A method of coupling light to a display panel from an LED arranged to be energized by conducting traces on a remotely located circuit board, comprising:

providing a display panel with an opening therein;

providing an integrally assembled lens unit and a light pipe, the light pipe having a light entrance and exit end, the lens unit having a light transmitting end wall defining a lens, a rearwardly facing shoulder for abutting a surface surrounding the opening in the display panel and a rearward structure extending away from the end wall, the rearward structure being arranged to extend through the display panel opening and defining a light pipe receptacle, the light exit end of the light pipe being bonded to the receptacle;

providing a fitting base with the LED mounted therein and having an axial bore through which light passes from the LED, the bore terminating in a receptacle for receiving the entrance end of the light pipe in a press fit relationship, the fitting base having a pair of openings remote from the receptacle and through which electrical leads from the LED extend;

threading the light pipe and the rearward structure of the lens unit through the display panel opening until the shoulder of the light pipe abuts the surface surrounding the display panel opening;

mounting the fitting base on the circuit board and connecting the leads thereof to the conducting traces; and inserting the light entrance end of the light pipe into the receptacle in the fitting base.

* * * * *

UNITED STATES PATENT AND TRADEMARK OFFICE
CERTIFICATE OF CORRECTION

PATENT NO.    : 6,302,595 B1
DATED         : October 16, 2001
INVENTOR(S)   : Vilgiate et al.

It is certified that error appears in the above-identified patent and that said Letters Patent is hereby corrected as shown below:

Column 5,
Line 20, "10b" should read -- 101b --.

Signed and Sealed this

Twenty-sixth Day of March, 2002

*Attest:*

*Attesting Officer*

JAMES E. ROGAN
*Director of the United States Patent and Trademark Office*